US005777449A

United States Patent [19]
Schlager

[11] Patent Number: 5,777,449
[45] Date of Patent: Jul. 7, 1998

[54] TORQUE RIPPLE REDUCTION USING BACK-EMF FEEDBACK

[75] Inventor: Karl Michael Schlager, Campbell, Calif.

[73] Assignee: SGS-Thomson Microelectronics, Inc., Carrollton, Tex.

[21] Appl. No.: 775,288

[22] Filed: Dec. 31, 1996

[51] Int. Cl.$^6$ .................................................. H02P 6/10
[52] U.S. Cl. ..................... 318/459; 318/254; 318/432; 318/448; 318/702; 388/901; 388/928.1
[58] Field of Search .......................... 318/254, 432, 318/439, 448, 459, 460, 500, 611, 636, 700, 702, 721, 722, 724; 388/901, 928.1

[56] References Cited

U.S. PATENT DOCUMENTS

| 4,096,419 | 6/1978 | Wren et al. .................. 318/138 |
| 4,645,991 | 2/1987 | Ban et al. . | |
| 4,651,067 | 3/1987 | Ito et al. ..................... 318/254 |
| 5,614,797 | 3/1997 | Carobolante ................ 318/432 |

FOREIGN PATENT DOCUMENTS 62-25889  2/1987  Japan .

*Primary Examiner*—Bentsu Ro
*Attorney, Agent, or Firm*—Steven D. Beyer; Theodore E. Galanthay; Lisa K. Jorgenson

[57] ABSTRACT

Methods and apparatuses are provided to identify and extract a torque ripple signal found in the back-emf signal from an electric motor. The torque ripple signal is used in a feedback control loop to reduce the amount and effects of torque ripple in the motor and the motor system. A motor controller is provided to reduce torque ripple in an electric motor. The motor controller is suitable for controlling the speed or torque or other related parameters associated with the electric motor. A disc drive apparatus for use in information storage and retrieval systems is provided. The disc drive apparatus includes an electric motor, an information storage disc, and a motor controller. A method is provided for reducing the effects of torque ripple in an electric motor by sampling the back-emf signal generated by the electric motor, extracting the torque ripple signal from the back-emf signal, and generating an AC component signal proportional to the torque ripple signal. This AC component signal is then used to create an error-correcting feedback control signal that can be used to modify the drive signal supplied to the motor such that the torque ripple in the motor is reduced. This method may be embodied using analog or digital circuitry, or a combination thereof.

22 Claims, 8 Drawing Sheets

TORQUE RIPPLE REDUCTION USING BACK-EMF FEEDBACK

BACKGROUND

The present invention relates generally to controlling electrical motors, and more specifically to methods and apparatuses for more effectively controlling an electric motor used in a disc drive by reducing the amount of torque ripple in the electric motor.

Disc drives are used by computer systems to record and reproduce information, i.e., data, on a recording media. The recording media typically takes the form of one or more circular information storage discs, such as magnetic or optical discs.

In addition to the recording media, a disc drive typically includes a read/write assembly and a spindle motor assembly. The read/write assembly is adapted to transfer data between the disk drive and an external system, or device, such as a microprocessor. The spindle motor assembly carries the information storage discs and is arranged to rotate the discs.

FIG. 1 represents a cross-section view of a typical spindle motor assembly 20 used in disc drive applications. As depicted, spindle motor assembly 20 includes a non-rotating spindle flange 22 which may be fastened to a disc drive housing, not shown. A rotatable spindle hub 24 is journaled about spindle flange 22 and is carried by an elongated rotatable shaft 28 that runs co-axially with spindle hub 24 and spindle flange 22. An information storage disc 26 is journaled about spindle hub 24. A pair of spaced apart ball bearings 30 are coupled between spindle shaft 28 and spindle flange 22. The ball bearings 30 allow spindle shaft 28 to rotate freely within the confines of spindle flange 22 along an axis 32.

A spindle motor 34 typically includes a stator assembly 36 and a rotor assembly 38. Stator assembly 36 usually includes a plurality of lamination stacks 40 having one or more coils 42 wrapped thereabout. Rotor assembly 38 is attached to spindle shaft 28 by a lower hub 44. Lower hub 44 typically includes a cup shaped rotor cap 46, a raised annular flange portion 48 with a plurality of magnets 50 disposed about the interior surface of flange portion 48.

During operation, one or more of coils 42 are energized with a drive signal which causes an electromagnetic field to develop about energized coils 42. The resulting attraction/repulsion between the electromagnetic field of energized coils 42 and the magnetic fields created by magnets 50 causes rotor assembly 38 and spindle shaft 28 to rotate about axis 32. While rotating, rotor assembly 38 causes a back-electromotive force (back-emf) signal to be generated in any unenergized coils 42 due to the movement of magnets 50 in relation to the unenergized coils 42.

In disc drives the speed of the spindle motor is typically controlled by a motor controller circuit. FIG. 2 shows a motor controller 62 electrically coupled to a motor 34 via a drive signal line 66 and a back-emf feedback line 68. With such a configuration, motor controller 62 may be used to drive the coils of motor 34 with a drive signal that is based on the desired rotational speed and a back-emf feedback signal.

Torque ripple is one of the audible components in an electric motor. Torque ripple exists because of the varying and uneven forces between one or more energized coils 42 and the magnetic fields of magnets 50. These uneven forces are a function of the relative location of magnets 50 to the energized coils 42. For example as each magnet moves nearer to the energized coils 42, the density of the magnetic field increases about the energized coils 42. As a result of this uneven magnetic field, the forces effecting the rotational speed of the spindle tend to vary thereby causing fluctuations, or jitter, in the motors rotational speed.

In disc drives torque ripple induced jitter may affect the timing of the bits in a data stream being transferred to or from the information storage disc. As the storage density of the information on the discs increases due to advancements in technology, torque ripple can introduce unacceptable jitter into the system.

In view of the foregoing, what is desired are methods and apparatuses for reducing torque ripple and its effects on a disc drive.

SUMMARY

The present invention provides novel methods and apparatuses that are arranged to identify and reduce torque ripple in electric motors. In accordance with one aspect of the present invention, a torque ripple signal is identified within a back-emf signal from an electric motor. This torque ripple signal is extracted in real-time and negatively, or inversely, or otherwise fed-back to the motor in the driving signal such that the amount of torque ripple is reduced or eliminated.

In one embodiment, a motor controller is provided that reduces torque ripple in an electric motor. The motor controller is suitable for controlling the speed or torque or other related parameters associated with electrical motors. The motor controller includes a torque ripple reducer and a controller. The torque ripple reducer takes a back-emf signal generated by the electric motor during operation, extracts a torque ripple signal from the back-emf signal and outputs a corresponding AC component signal. This AC component signal is used by the controller in generating and outputting a modified drive signal that takes into account the torque ripple of the motor and reduces it.

In one embodiment, the electric motor is utilized in a disc drive apparatus that includes an information storage disc, and a motor controller including a torque ripple reducer and a controller. The motor controller takes into account the torque ripple and reduces its effect on the operation of the disc drive apparatus.

In one embodiment, a method is provided for reducing the effects of torque ripple in an electric motor by sampling the back-emf signal generated by the electric motor, extracting the torque ripple signal from the back-emf signal, and generating an AC component signal proportional to the torque ripple signal. This AC component signal is then used to create an error correcting feedback control signal that can be used to modify the drive signal supplied to the motor such that the torque ripple in the motor is reduced. This method may be embodied using analog or digital circuitry, or a combination thereof.

BRIEF DESCRIPTION OF THE DRAWINGS

The invention, together with further objects and advantages thereof, may best be understood by reference to the following description taken in conjunction with the accompanying drawings in which.

3

Figure 1:
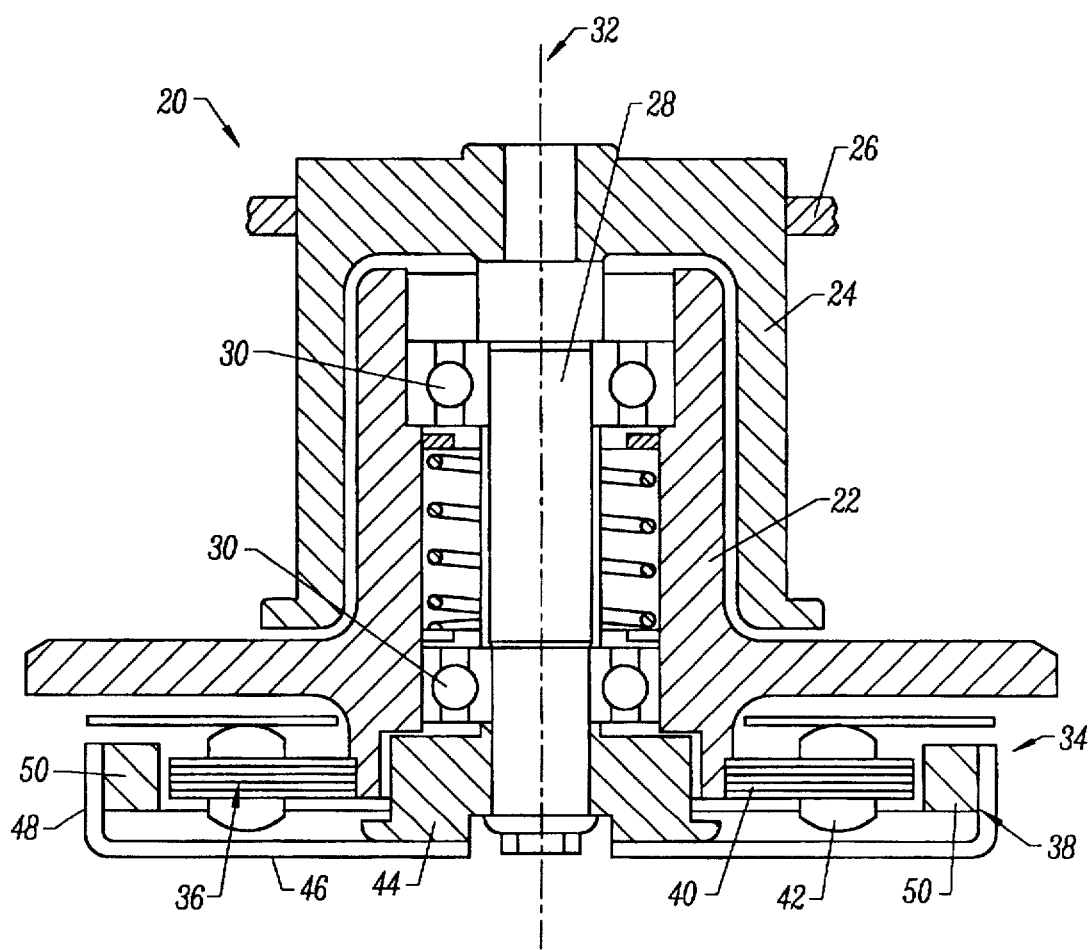
FIG. 1 is a cross-sectional view of a typical spindle motor assembly found in disc drives.
Figure 2:
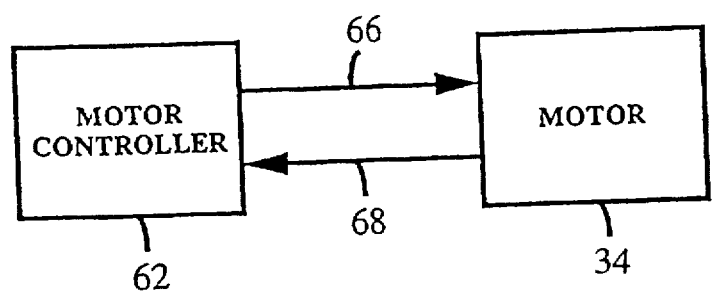
FIG. 2 is a block diagram of a typical disc drive having a motor controller coupled to drive a motor.
Figure 3A:
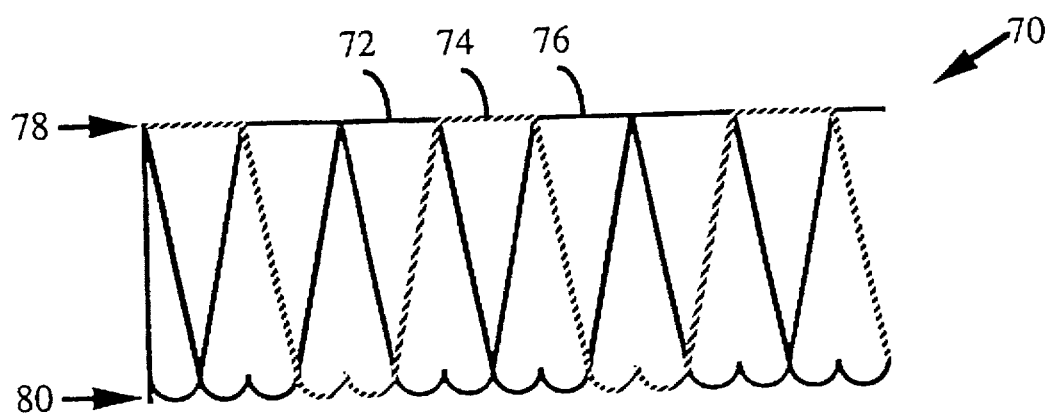
FIG. 3a illustrates a typical multi-phase waveform of a back-emf signal generated by a motor as depicted in FIG. 2.
Figure 3B:
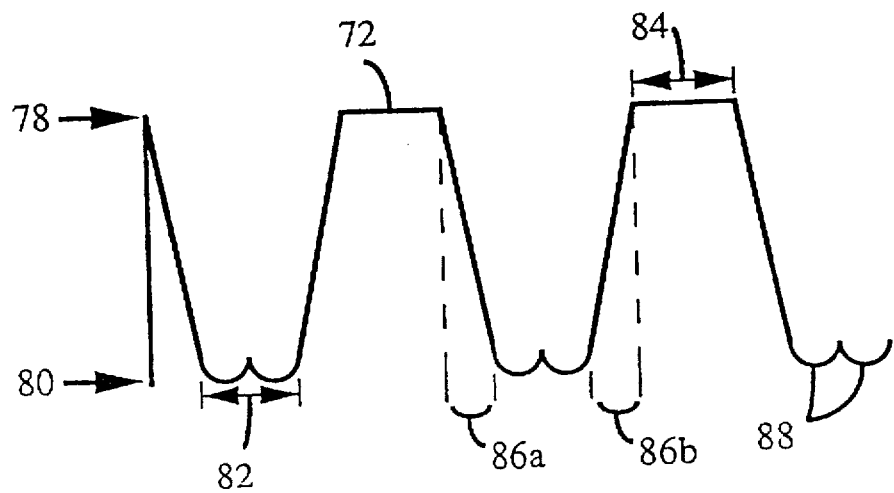
Figure 3C:
Figure 4:
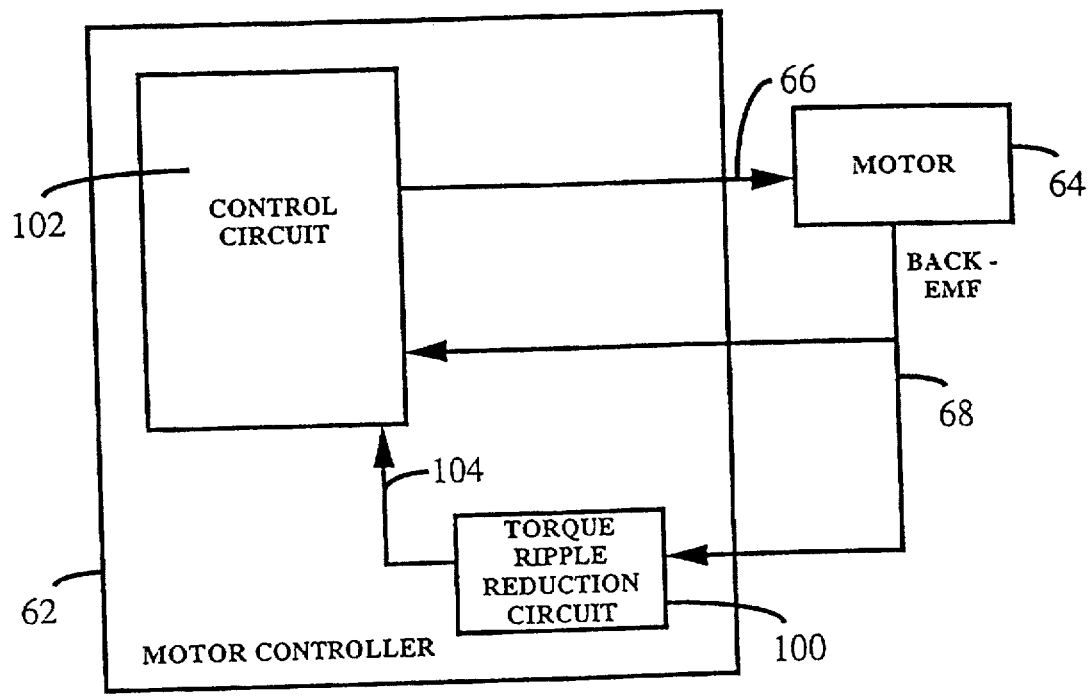
Figure 5A:
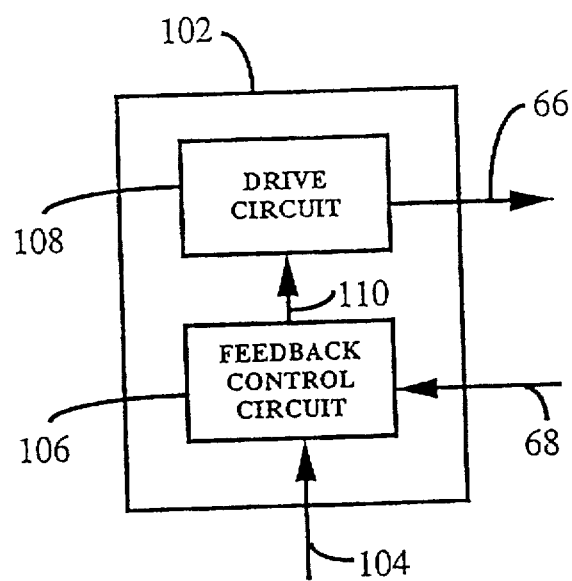
Figure 5B:
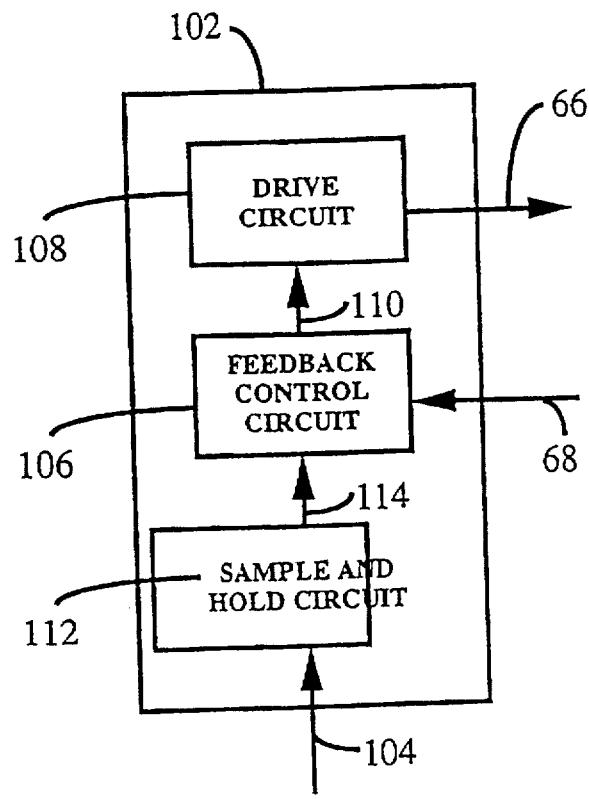
Figure 6:
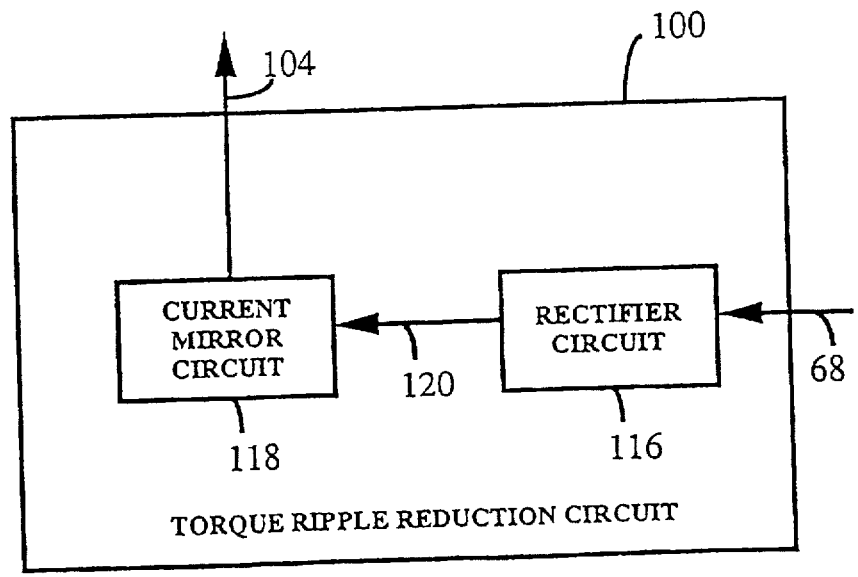
Figure 7:
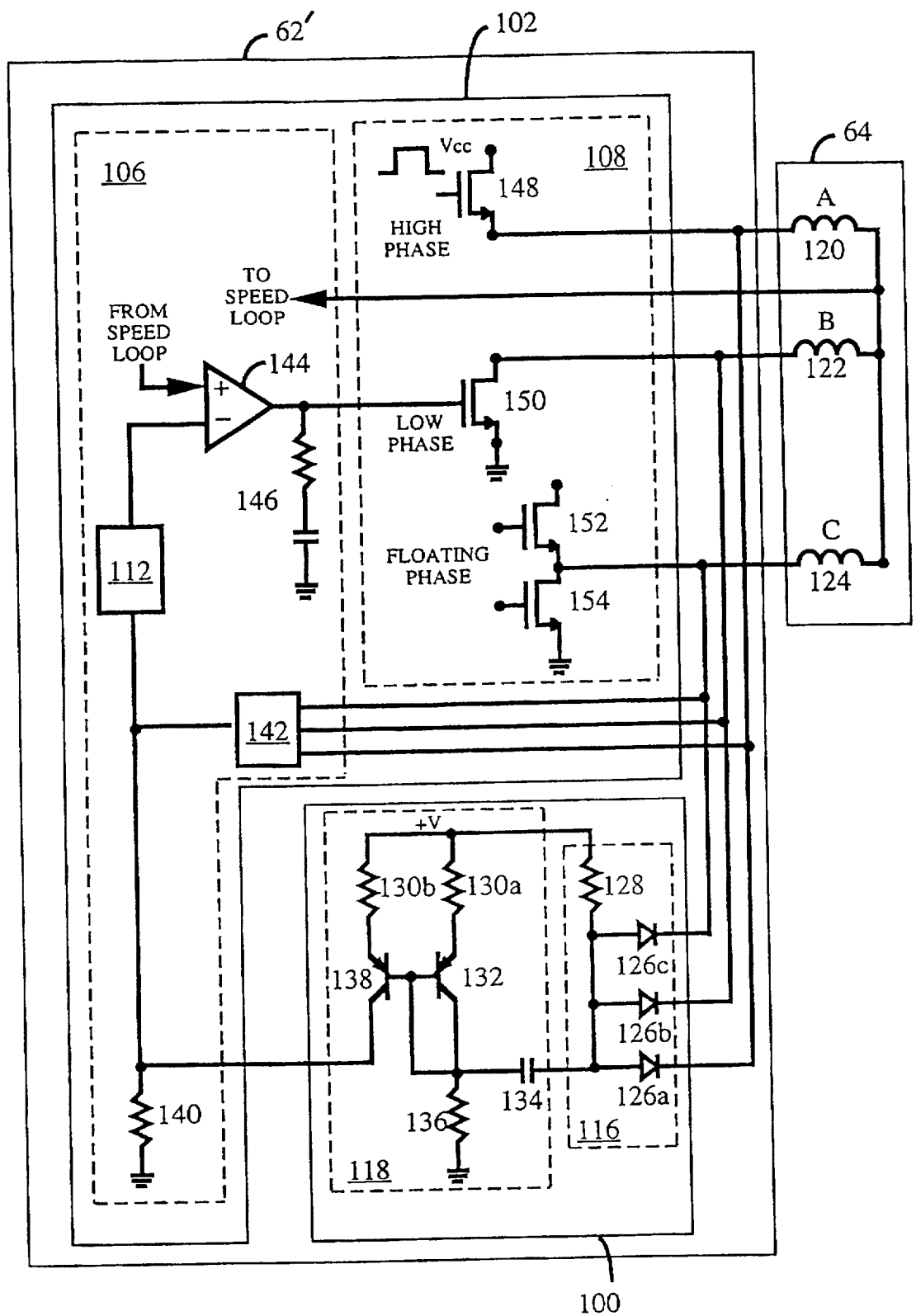
Figure 8:
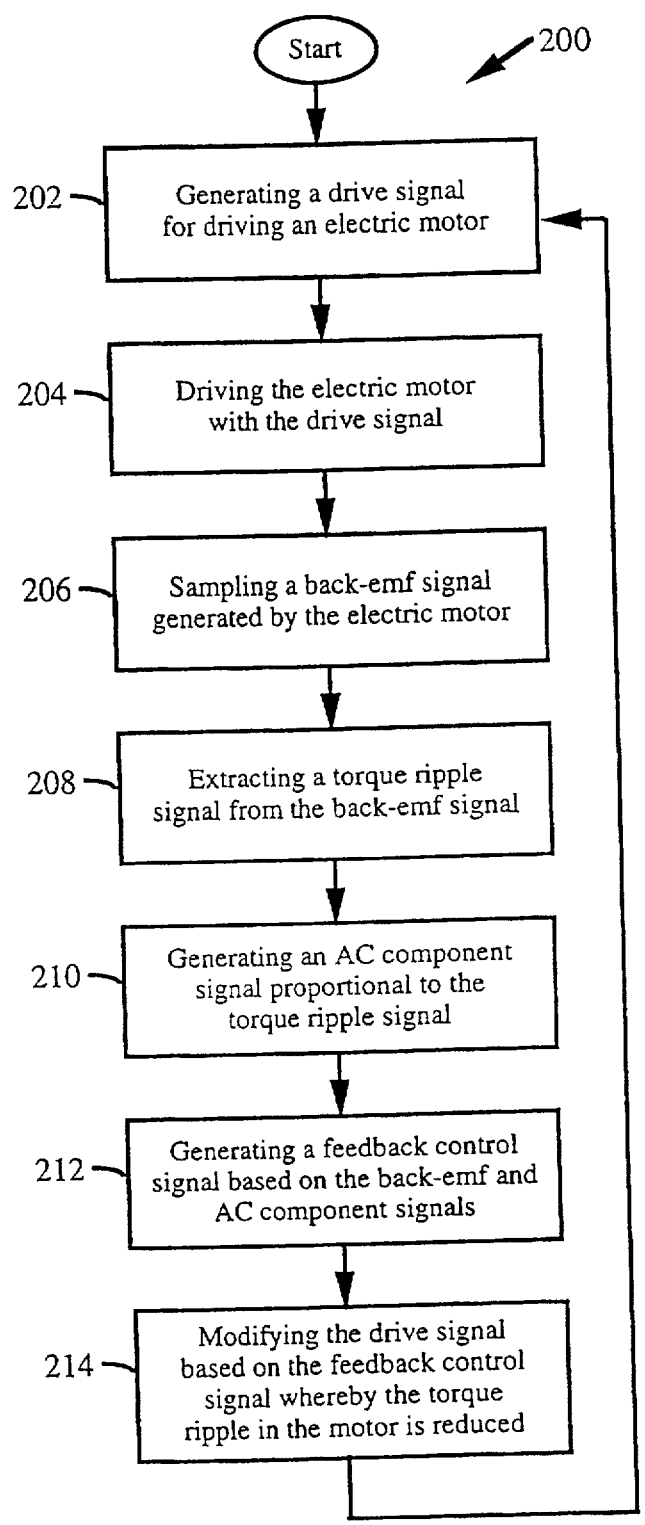
Figures 9A, 9B:
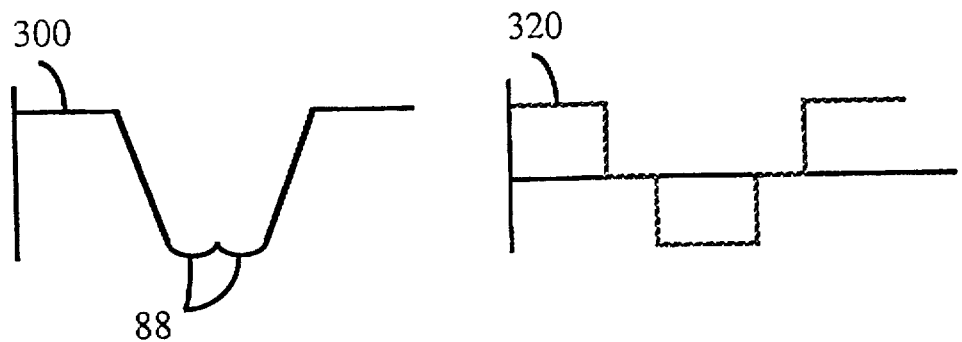
Figures 9C, 9D:
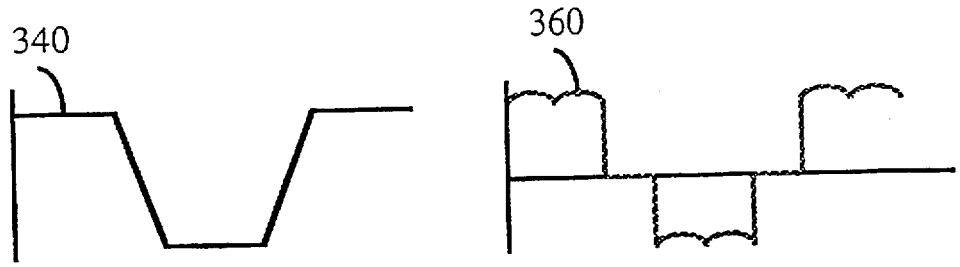

FIG. 3b illustrates one phase of the typical multi-phase waveform of a back-emf signal as depicted in FIG. 3a;

FIG. 3c illustrates the torque ripple signal portion of the typical multi-phase waveform as depicted in FIG. 3a;

FIG. 4 is a block diagram of one embodiment of the present invention in the form of an improved motor controller as depicted in FIG. 2, further including a torque ripple reduction circuit and control circuit;

FIG. 5a is a block diagram of one embodiment of the control circuit depicted in FIG. 4;

FIG. 5b is a block diagram of another embodiment of the control circuit depicted in FIG. 4;

FIG. 6 is a block diagram of one embodiment of the torque ripple reduction circuit depicted in FIG. 4;

FIG. 7 is a schematic of one embodiment of the present invention in the form of an improved motor controller having a torque ripple reduction circuit and control circuit;

FIG. 8 is a flow-chart of a method of the present invention for reducing torque ripple in a motor;

FIG. 9a illustrates the shape of a typical pre-invention back-emf voltage signal across a single coil, having a torque ripple signal component;

FIG. 9b illustrates the shape of a pre-invention drive signal corresponding to the signal in FIG. 9a;

FIG. 9c illustrates the shape of a drive signal in accordance with the present invention, and FIG. 9d illustrates the shape of a back emf signal across a single coil resulting from the application of the drive signal in FIG. 9c, having a significantly reduced torque ripple signal component.

DESCRIPTION

The present invention applies methods and apparatuses for reducing torque ripple to electrical motors, motor controller circuits and systems and devices using electrical motors. More particularly, the present invention applies to motor controller circuits that are designed to operate or drive electric spindle motors at a nearly constant speed. One example of such a motor controller circuit is the L6260 Controller available from SGS-Thomson Microelectronics, Inc., of Carrollton, Tex., USA. This type of motor controller can be used in conventional disc drives to control the speed of the spindle motor.

Disc drives typically utilize a three-phase brushless, sensorless spindle motor that is driven by either a 5 or 12 volt drive signal depending upon the type of computer system. For example, a disc drive for use with a portable or laptop computer may operate on a 5 volt drive signal, while a disk drive for use with a desktop computer system may operate on a 12 volt drive signal.

In either case, the motor controller circuit is usually designed to output a drive signal that quickly brings the motor from a non-rotating state to a rotating state and then maintains the rotating speed at a substantially constant level. This may be accomplished by initially supplying an increased electrical current to bring the motor up to the desired speed followed by a fairly constant electrical current to maintain the desired speed. Within the motor controller circuit, the speed of the rotating motor is typically monitored via feedback control loop circuitry. To maintain the desired rotational speed, the feedback control loop circuitry can be coupled to modify the current of the drive signal based on the differences between the desired and measured or calculated rotational speed.

4

Three-phase motors are typically designed with a separate coil for each of three phases. These coils are usually coupled to a common center tap. As a result of this configuration three phase motors may be operated in several different modes of operation, including unipolar, bipolar and tripolar modes. In unipolar mode only one of the coils is driven at a time. In bipolar mode two of the three coils are being driven at a given time. In tripolar mode all three coils are driven at the same time. These and other operating modes, such as pulse width modulation operating modes and related digitally controlled modes, are well known to those skilled in the art. It is believed that the methods and apparatuses of the present invention can be easily adapted by those skilled in the art to effectively reduce torque ripple in electric motors, including single or multi-phase electric motors, that are operated in the aforementioned modes or other equivalent modes.

The described embodiment of present invention is particularly applicable for operating a three phase brushless sensorless spindle motor in a bipolar mode wherein, at any one time, one coil is driven HIGH, one coil is driven LOW and the remaining coil is left FLOATING. This can be accomplished by switching the connections applying the drive signal to each phase's coil. When switched to HIGH a coil will be at a HIGH voltage level and have a positive current flow. When switched to LOW a coil will be at a LOW voltage level and have a negative current flow. When switched to FLOATING a coil will have a falling or rising voltage level depending upon its previous state (i.e., HIGH or LOW, respectively) and will have no current flow. This bipolar switching operation is further illustrated in the waveforms shown in FIGS. 3a–c.

Variances in rotational speed, caused in part by torque ripple, are reflected in the resulting back-emf signal as an additional, lower magnitude, sinusoidal (time-varying) component signal. This torque ripple signal is inversely proportional to the torque ripple in the motor. Thus, the torque ripple signal will be at a maximum magnitude when the torque ripple is most prevalent, i.e., when the magnetic fields are strongest.

FIGS. 3a–c illustrate the typical components of a back-emf signal generated by a three phase spindle motor operating in a bipolar mode. FIG. 3a illustrates a back-emf signal 70 comprised of three back-emf phase signals 72, 74 and 76, switching between a HIGH voltage level 78 and a LOW voltage level 80 over time.

FIG. 3b illustrates the typical waveform associated with one of the phases of back-emf signal 70, namely back-emf phase signal 72, as extrapolated from FIG. 3a. FIG. 3b better illustrates the switching characteristics of signal 72 between HIGH 78 and LOW 80 voltage levels. As shown, back-emf phase signal 72 is momentarily at LOW voltage level 80 during LOW voltage period 82. Back-emf phase signal 72 is momentarily at HIGH voltage level 78 during HIGH voltage period 84. Between LOW 82 and HIGH 84 voltage periods, back-emf phase signal 72 is FLOATING as depicted by FLOATING voltage periods 86a and 86b.

As shown, during LOW voltage period 82 the waveform of back-emf phase signal 72 includes an additional torque ripple signal 88. Torque ripple signal 88 represents the torque ripple effects on one phase of the three-phase spindle motor. Referring back to FIG. 3a, it can be seen that each of the back-emf phase signals 72, 74 and 76 includes a torque ripple signal 88.

FIG. 3c illustrates an AC component signal 90 resulting from the combined ripple signals 88 of back-emf phase signals 72, 74 and 76 as shown in FIG. 3a. The waveform of AC component signal 90 may be obtained from back-emf signal 70 by typical rectification means, such as an analog filter/rectifier circuit, or by digitally sampling extraction methods. AC component signal 90 essentially represents the torque ripple effects on all three phases of a three-phase spindle motor.

The present invention identifies this torque ripple signal in the back-emf signal and utilizes it to counteract and reduce the torque ripple in the motor. As a result, the present invention tends to reduce induced torque ripple jitter in devices such as disc drives.

FIG. 4 illustrates a motor controller 62 which is electrically coupled to a motor 34, for controlling the operation of motor 34. As shown, motor controller 62 outputs a drive signal to drive signal line 66 which causes motor 34 to operate. Motor 34 outputs a back-emf signal which is fed-back to motor controller circuit 62 via back-emf feedback line 68. The back-emf signal may be used to monitor and control the speed or torque of motor 34. Techniques for feedback control, such as this, are well known to those skilled in the art.

Within motor controller 62, there is a torque ripple reduction circuit 100 and a control circuit 102, each of which are electrically coupled to receive the back-emf signal from motor 34. Torque ripple reduction circuit 100 extracts the torque ripple signal from the back-emf signal and generates a proportional AC component signal which is supplied to control circuit 102 over AC component signal line 104.

Control circuit 102 utilizes the back-emf signal and the AC component signal in generating the drive signal to drive motor 34. For example, the position and rotational speed of the motor may be determined by sampling the back-emf signal during a FLOATING voltage period and monitoring particular voltage level crossings. This positioning information can then be used to control the speed of motor 34 via the drive signal. The AC component signal can be used within control circuit 102 to modify the drive signal, so as to counteract torque ripple, by supplying additional current to the coils of motor 34 at critical times thereby reducing the effects of torque ripple.

FIG. 5a shows one embodiment of control circuit 102 having a feedback control circuit 106 and a drive circuit 108. Feedback control circuit 106 receives the back-emf and AC component signals and outputs a feedback control signal to feedback control signal line 110. Feedback control circuit 106 is a closed loop circuit that compares inputted, or internally generated signals, with the back-emf and AC component signals to generate a signal representative of the perceived errors or differences and output a feedback control signal intended to reduce such differences. Those skilled in the art will recognize that there are many possible ways to create such a circuit using standard or custom electronic components. For example, to accomplish this functionality, feedback control circuit 106 may include an operational amplifier and associated conditioning circuitry.

The overall gain in feedback control circuit 106 may be optimized for particular circuits and motors. As such, it is recognized that the AC component signal may be amplified or suppressed prior to being introduced into the feedback control loop. Not surprisingly, experiments associated with the present invention tend to show that by increasing the gain of the AC component signal the torque ripple is reduced proportionally.

FIG. 5b shows a modified control circuit 102 similar to that shown in FIG. 5a, but further including a sample and hold circuit 112 that receives the AC component signal from AC component signal line 104 and filters or smoothes-out the AC component waveform such that spikes and other noises are reduced or eliminated from the AC component signal prior to it being supplied to feedback control circuit 106 over sampled AC component signal line 114. For example, sample and hold circuit 112 may be used to smooth out the AC component signal by reducing noise associated with the commutation points related to the spinning of the motor by sampling the AC component signal and averaging the signal's magnitude over finite periods of time.

It is further recognized that, depending upon the type of feedback control circuit, one or both of the back-emf and AC component signals may be further conditioned, converted, inverted, or otherwise modified to properly influence the feedback control loop and subsequently the drive signal provided to motor 34.

FIG. 6 shows one embodiment of a torque ripple reduction circuit 100, having a rectifier circuit 116 and a current mirror circuit 118. Rectifier circuit 116 receives the back-emf signal from back-emf signal line 68 and extracts and outputs a torque ripple signal from the back-emf signal over torque ripple signal line 120. Those skilled in the art will recognize that there are many different ways to create a rectifier circuit using standard or custom electronic components. For example, rectifier circuit 116 may include a negative peak detector diode circuit that separates the torque ripple signal from the back-emf signal. Current mirror circuit 118 receives the torque ripple signal and converts it to a proportional AC component signal that is output over AC component signal line 104. Again, those skilled in the art will recognize that there are many different ways to create a current mirror circuit using standard or custom electronic components. For example, current mirror circuit 118 may include a pair of coupled transistors and associated conditioning circuitry to convert the torque ripple signal into an AC component signal wherein the current of the AC component signal is proportional to the torque ripple signal's voltage. Additionally, current mirror circuit 118 may also be configured to increase or decrease the gain of the AC component signal or portions thereto.

FIG. 7 illustrates one embodiment of the present invention in the form of a motor controller 62' having a torque ripple reduction circuit 100 and a control circuit 102, which are electrically coupled to a motor 34. Within control circuit 102 there is a feedback circuit 106 which is electrically coupled to a drive circuit 108 (as depicted by the dashed-lined areas in FIG. 7).

Drive circuit 108 is electrically coupled to motor 34 and supplies the proper commutation related connections and drive signals to coils 120, 122, and 124 which are located within motor 34. As shown, coil 120 receives phase A signals, coil 122 receives phase B signals, and coil 124 receives phase C signals. For the purposes of this discussion (as reflected in FIG. 7), phase A (i.e., coil 120) is considered as being driven high by drive circuit 108, phase B (i.e., coil 122) is considered as being driven low by drive circuit 108, and phase C (i.e., coil 124) is considered as being in a floating state (i.e., driven neither high nor low by drive circuit 108).

Although phase C is floating, a BEMF signal will nonetheless be produced in coil 124. The BEMF signal is supplied to feedback control circuit 106 and to torque ripple reduction circuit 100. Within torque ripple reduction circuit 100 there is a rectifier circuit 116 and current mirror circuit 118. Rectifier circuit 116 is electrically coupled to receive and rectify a BEMF signal from coils 120, 122 and 124. Rectifier circuit 116 includes diodes 126a, 126b and 126c, which are arranged to receive BEMF signals from coils 120, 122 and 124, respectively. Diodes 126a–c act as a negative peak detector, the output of which is a torque ripple signal applied across resistor 128 and supplied to current mirror 118.

Current mirror 118 includes resistors 130a and 130b, a collector-base shorted PNP transistor 132, a capacitor 134, a resistor 136, and a PNP transistor 138. The torque ripple signal is applied across resistors 130a–b, along with a positive D.C. signal (+V), to the emitters of PNP transistors 132 and 138. PNP transistor 132, having its base and collector short circuited, essentially acts as a diode that establishes a D.C. bias current. The torque ripple signal is applied to capacitor 134 and is imposed onto the D.C. bias current over resistor 136. The D.C. bias current and torque ripple signal, as applied to resistor 136, act to modulate the output current of PNP transistor 138 which is applied to a sense resistor 140 located within feedback loop circuit 106. As a result, the output current of PNP transistor 138 which is an AC component signal, will mirror the voltage of torque ripple signal.

The AC component signal generated by current mirror circuit 118 is applied to a sample and hold circuit 112, along with the conventional feedback signal generated by current sensing circuit 142. Current sensing circuit 142 is electrically coupled to receive and detect the BEMF generated in coils 120–124. Sample and hold circuit 112 can be a standard sample and hold circuit, as is known in the art, that is arranged to sample the combined AC component signal and the signal from current sensing circuit 142. The output of sample and hold circuit 112 is a smoothed-out feedback control signal which is supplied to the negative input of an error amplifier 144. Error amplifier 144 may, for example, be an operational transconductance amplifier (OTA). Error amplifier 144 is also connected to receive a control signal from conventional speed loop control and monitoring circuitry (not shown). Error amplifier 144 compares the control signal (e.g., representing the desired rotational speed of the motor) with the feedback control signal. The output of error amplifier 144 is a corrected signal which is applied across compensation circuitry 146 (shown as including a series connected resistor and capacitor) and to drive circuit 108.

It should be noted that, as with other conventional circuitry in control circuit 102, not all of the circuits are depicted in FIG. 7, so as to not overly complicate the various embodiments of this invention which are intended to supplement and improve existing technologies.

With this in mind, drive circuit 108, as illustrated, includes power transistors 148, 150, 152, and 154. Power transistor 148 represents the high side power transistor associated with supplying a drive signal across coil 120, power transistor 150 represents the low side power transistor associated with pulling a drive signal across coil 122, power transistor 152 represents the high side power transistor associated with supplying a drive signal across coil 124, and power transistor 154 represents the low side power transistor associated with pulling a drive signal across coil 124 (assuming the illustrative configuration and status of the circuitry in FIG. 7). Power transistors 148–154, may be, for example, NMOS transistors capable of supplying the start-up and running currents required for motor 34.

As shown, when a $V_{cc}$ signal originating from within drive circuit 108 is applied to the gate of power transistor 148 and the output of error amplifier 144 is applied to the gate of power transistor 150, a drive signal is allowed to pass through coils 120 and 122, so as to drive motor 34. While operating as above, power transistors 152 and 154 are not biased, and coil 124 is, therefore, allowed to exist in a floating state.

FIG. 8 illustrates a method 200 for reducing the effects of torque ripple in an electric motor that can be employed in operating and controlling circuitry associated with the electric motor. Method 200 includes step 202 for generating a drive signal for driving the electric motor, and step 204 for driving the motor with the drive signal generated in step 202. As the motor is being driven, step 206 calls for sampling a back-emf signal generated within the motor in step 204, and step 208 for extracting a torque ripple signal from the back-emf signal as sampled in step 206. Step 210 includes generating an AC component signal that is proportional to the extracted torque ripple signal of step 208. Step 212 includes generating a feedback control signal based on the back-emf and AC component signals, of steps 208 and 210 respectively. In step 214 the drive signal as generated in step 202 is modified based on the feedback control signal, generated in step 212, such that the torque ripple in the motor is reduced when the modified drive signal is applied to the motor in step 204.

To further demonstrate the methods and apparatuses of the present invention, FIG. 9a illustrates the shape of a typical pre-invention back-emf voltage signal 300 across a single coil, having a torque ripple signal 88 (similar to FIG. 3b). FIG. 9b illustrates the shape of a corresponding pre-invention current drive signal 320 as applied to the coil of FIG. 9a. FIG. 9c illustrates the shape of a post-invention current drive signal 340 having been modified to counteract torque ripple signal 88 in accordance with the present invention. FIG. 9d illustrates the shape of a post-invention back emf signal 360 across a single coil being driven by the post-invention current drive signal 340 in FIG. 9c. Notice that the torque ripple signal 88 shown in the pre-invention back-emf voltage signal 300 of FIG. 9a, has been significantly reduced in the post-invention back emf signal 360 of FIG. 9d.

While the present invention has been described in detail, there are many alternative ways of implementing the methods and apparatus of the present invention. It is therefore intended that the following appended claims be interpreted as including all such alterations, permutations, and equivalents as fall within the true spirit and scope of the present invention.

What is claimed is:

1. A motor controller that reduces torque ripple in an electric motor, the motor controller comprising:

a torque ripple reducer arranged to receive a back-emf signal from the electric motor, extract a torque ripple signal from the back-emf signal, and output an AC component signal; and a controller arranged to receive the AC component and back-emf signals and output a drive signal suitable for driving the electric motor.

2. A motor controller as recited in claim 1 wherein the controller comprises:

a feedback control circuit that receives the AC component and back-emf signals, and outputs a feedback control signal; and a drive circuit that receives the feedback control signal, and outputs the drive signal.

3. A motor controller as recited in claim 2 wherein the feedback control circuit further comprises a sample and hold circuit that receives the AC component signal, reduces noise in the AC component signal, and outputs the AC component signal with less noise.

4. A motor controller as recited in claim 1 wherein the torque ripple reducer comprises a rectifier circuit that receives the back-emf signal, extracts the torque ripple signal from the back-emf signal, and outputs the torque ripple signal.

5. A motor controller as recited in claim 4 wherein the rectifier circuit is a negative peak detector.

6. A motor controller as recited in claim 5 wherein the negative peak detector comprises a first diode, a second diode and a third diode, and a resistor, the first diode being arranged to receive a back-emf signal from a first coil of the electric motor, the second diode being arranged to receive a back-emf signal from a second coil of the electric motor, the third diode being arranged to receive a back-emf signal from a third coil of the electric motor, the first, second and third diodes being electrically coupled to a common output node for outputting the torque ripple signal as extracted from the respective back-emf signals therein, the torque ripple signal being applied across the resistor which is also electrically coupled to the common output node.

7. A motor controller as recited in claim 1 wherein the torque ripple reducer comprises a current mirror circuit that receives the torque ripple signal and outputs the AC component signal.

8. A motor controller as recited in claim 7 wherein the current mirror circuit comprises a first transistor and a second transistor, the first transistor being arranged to establish a direct current bias across a resistor, a collector and a base node of the first transistor being short circuited together, the first transistor being modulated by the torque ripple signal, a collector of the second transistor being electrically coupled to the collector and the base of the first transistor and arranged to output the AC component signal, wherein a current of the AC component signal is substantially proportional a voltage of the torque ripple signal.

9. A motor controller as recited in claim 7 wherein the AC component signal is proportional to the torque ripple signal.

10. A disc drive apparatus comprising:

(a) an electric motor having a spindle hub arranged to rotate about an axis, and a plurality of magnets and a plurality of drive coils arranged about the axis;

(b) an information storage disc journaled about the spindle hub; and (c) a motor controller including (i) a torque ripple reducer arranged to receive a back-emf signal from the electric motor, extract a torque ripple signal from the back-emf signal, and output an AC component signal; and (ii) a controller arranged to receive the AC component and back-emf signals and output a drive signal suitable for driving the electric motor, wherein the back-emf signal is taken from the coils of the electric motor.

11. A disc drive apparatus as recited in claim 10 wherein the controller comprises:

a feedback control circuit that receives the AC component and back-emf signals, and outputs a feedback control signal; and a drive circuit that receives the feedback control signal, and outputs the drive signal.

12. A disc drive apparatus as recited in claim 11 wherein the feedback control circuit senses the speed of the spindle hub.

13. A disc drive apparatus as recited in claim 11 wherein the feedback control circuit further comprises a sample and hold circuit that receives the AC component signal, reduces noise in the AC component signal, and outputs the AC component signal with less noise.

14. A disc drive apparatus as recited in claim 10 wherein the torque ripple reducer comprises a rectifier circuit that receives the back-emf signal, extracts the torque ripple signal from the back-emf signal, and outputs the torque ripple signal.

15. A disc drive apparatus as recited in claim 14 wherein the rectifier circuit is a negative peak detector.

16. A disc drive apparatus as recited in claim 10 wherein the torque ripple reducer comprises a current mirror circuit that receives the torque ripple signal and outputs the AC component signal.

17. A disc drive apparatus as recited in claim 16 wherein the AC component signal is proportional to the torque ripple signal.

18. A method for reducing the effects of torque ripple in an electric motor, the method comprising:

generating a drive signal suitable for driving the electric motor;

driving the electric motor with the drive signal;

sampling a back-emf signal generated by the electric motor;

extracting a torque ripple signal from the back-emf signal;

generating an AC component signal proportional to the torque ripple signal;

generating a feedback control signal based on the back-emf and AC component signals; and modifying the drive signal based on the feedback control signal such that the torque ripple in the motor is reduced.

19. A method as recited in claim 18 wherein the drive signal controls the rotational speed of the electric motor.

20. A method as recited in claim 19 further comprising altering the AC component signal waveform prior to generating the feedback control signal.

21. A method as recited in claim 18 wherein sampling the back-emf signal, extracting the torque ripple signal and generating the AC component signal comprises the use of analog circuitry.

22. A method as recited in claim 18 wherein sampling the back-emf signal, extracting the torque ripple signal and generating the AC component signal comprises the use of digital circuitry.

* * * * *